United States Patent
Satish et al.

(10) Patent No.: US 7,886,282 B1
(45) Date of Patent: Feb. 8, 2011

(54) AUGMENTING SIGNATURE-BASED TECHNOLOGIES WITH FUNCTIONAL FLOW GRAPHS

(75) Inventors: Sourabh Satish, Fremont, CA (US); Greg Vogel, Chatsworth, CA (US)

(73) Assignee: Symantec Corporation, Mountain View, CA (US)

( * ) Notice: Subject to any disclaimer, the term of this patent is extended or adjusted under 35 U.S.C. 154(b) by 1134 days.

(21) Appl. No.: 11/394,524

(22) Filed: Mar. 31, 2006

(51) Int. Cl.
G06F 9/44 (2006.01)

(52) U.S. Cl. .................................... 717/132; 717/133

(58) Field of Classification Search ................ 717/132, 717/156, 133
See application file for complete search history.

(56) References Cited

U.S. PATENT DOCUMENTS

2004/0174397 A1* 9/2004 Cereghini et al. ........... 345/855

OTHER PUBLICATIONS

Halvar Flake, Structural Comparison of Executable Objects, Jul. 6, 2004, DIMVA 2004.*
Halvar Flake, "Compare, Port, Navigate", Mar. 31, 2005, BlackHat Briefings Europe 2005.*
Thomas Dullien and Rolf Rolles, "Graph Based Comparison of Executable Objects", Jun. 2005, Symposium sur la Securite des Technologies de l'Information et des Communications (SSTIC).*
Oscar Hernandez et al., "Dragon: A Static and dynamic Tool for OpenMP", Jan. 25, 2005, Springer-Verlag Berlin Heidelberg, WOMPAT 2004, LNCS 3349, pp. 53-66.*
"Gold Parser, A Free Multi-Platform Parser Generator", [online] devincook.com [retrieved Oct. 7, 2003] Retrieved from the Internet: <URL: http://www.devincook.com/goldparser/index.htm>.
"RFC 2821—Simple Mail Transport Protocol", Klensen J., editor, Apr. 2001, [online] Faqs.org [retrieved Oct. 13, 2003] Retrieved from the Internet: <URL: http://www.faqs.org/rfcs/rfc2821.html>.
Pop-Up Stopper Professional [Online] Apr. 22, 2005, [Retrieved from the Internet on Apr. 22, 2005] Retrieved from the Internet: <URL: http://www.panicware.com/index.html>, Seattle, WA.
AdsCleaner v 4.3 for Windows NT/2000/XP, [Online] Apr. 22, 2005 [Retrieved from the Internet on Apr. 22, 2005] Retrieved from the Internet: <URL: http://www.adscleaner.com>.
AntiTracer: Unwanted Pop-ups and other Advertisements, [Online] Apr. 22, 2005, [Retrieved from the Internet on Apr. 22, 2005] Retrieved from the Internet: <URL: http://www.antitracer.com/popup_killer.html>, Dublin, IE.

(Continued)

*Primary Examiner*—Wei Y Zhen
*Assistant Examiner*—Lanny Ung
(74) *Attorney, Agent, or Firm*—Hunton & Williams, LLP

(57) ABSTRACT

Techniques for verifying a signature of an executable file are disclosed. In one particular exemplary embodiment, the techniques may be realized as a computer-implemented method for verifying a signature of a first executable file, comprising creating a first functional flow graph from the first executable file, storing the first functional flow graph, receiving, using a processor, a rule for the first executable file, and storing the rule. The techniques may also comprise receiving a second executable file, creating a second functional flow graph from the second executable file, determining whether a difference between the first functional flow graph and the second functional flow graph is less than a tolerance, and when it is determined that the difference between the first functional flow graph and the second functional flow graph is less than the tolerance, applying the rule to the second executable file.

22 Claims, 3 Drawing Sheets

OTHER PUBLICATIONS

Sabin, Todd, "Comparing binaries with graph isomorphisms", downloaded from http://www.bindview.com/Services/Razor/Papers/2004/comparing_binaries.cfm, Jan. 17, 2006, Cupertino, CA.

Flake, Halvar, "Automated Reverse Engineering" Black Hat Windows 2004, downloaded from http://www.blackhat.com/html/bh-media-archives/bh-archives-2004.html, Jan. 17, 2006, Seattle, WA.

* cited by examiner

AUGMENTING SIGNATURE-BASED TECHNOLOGIES WITH FUNCTIONAL FLOW GRAPHS

TECHNICAL FIELD

This invention pertains to the field of signature-based technologies, and in particular, to methods and systems for verifying the signature of binary executable files.

BACKGROUND ART

Conventional techniques to verify signatures of binary executable files include sectional hash or checksum comparisons. These techniques are subject to false negatives because a change in a few lines of code may lead to different register allocations. Similarly, compiler optimization may lead to the shifting of various code blocks. Thus, in any kind of security technology which is signature-based, if a vendor updates a binary executable file, or if the binary is recompiled with different flags, the signature of the binary may no longer be effective. This is problematic for a security vendor who must continuously add or update more and more signatures to account for the variants. This also may be a frustrating experience for a user. For example, the user may set the security decisions for the application to authorize the application to communicate over the network. Each time the application receives a patch or update, the application signature may become invalid, thus forcing the user to reset the security decision. Because binaries change often, this may become cumbersome to the user. Thus, there is a need in the art for means to identify binaries at a higher level so that minor changes to the binary or a recompilation of the binary may be distinguished from a completely different application having the same file name or located in the same location.

DISCLOSURE OF INVENTION

In accordance with methods and systems consistent with the present invention, computer-implemented methods, apparatus, and computer-readable media are provided for verifying a signature of a first executable file. An embodiment of the inventive method comprises the steps of creating (210) a first functional flow graph from the first executable file; storing (220) the first functional flow graph; receiving (230) a rule for the first executable file; storing (240) the rule; receiving (250) a second executable file; creating (260) a second functional flow graph from the second executable file; determining (270) whether a difference between the first functional flow graph and the second functional flow graph is less than a tolerance; and when it is determined that the difference between the first functional flow graph and the second functional flow graph is less than the tolerance, applying (280) the rule to the second executable file.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Methods, apparatus, and articles of manufacture consistent with the present invention overcome the shortcomings of the prior art by using a functional flow graph of the binary executable file as the signature of the file. These signatures are more tolerant to change than the signatures derived using conventional hash-based approaches.

Using methods and systems consistent with the present invention, when a user makes a decision to allow or disallow an application to communicate over a network, a functional flow graph based signature may be created and stored in memory. If that application gets updated or patched, methods and systems consistent with the present invention may recompute the functional flow graph and determine whether the recomputed functional flow graph is substantially the same as the functional flow graph of the original binary. If the two functional flow graphs are found to be substantially the same, then the rule, i.e., the user's preferences and/or security decisions, may be applied to the updated binary. The security decisions may be set by the user, or they may be created by the security vendor. Other information such as the location of the binary on the file system, or the name of the binary file also may be considered to ensure that the binary is indeed a variation of the same file or process.

Figure 1:
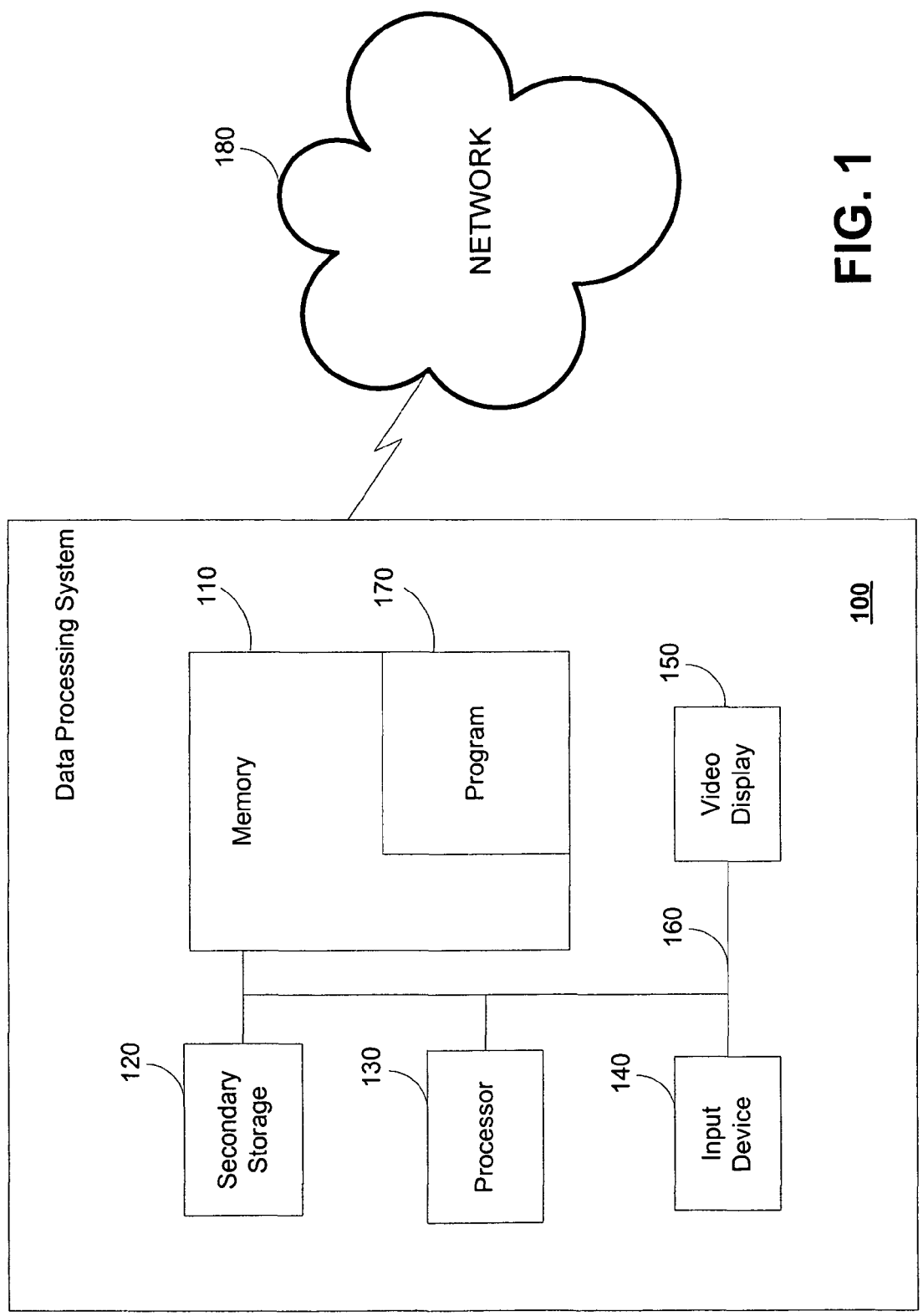
FIG. 1 depicts a data processing system suitable for implementing an embodiment of the present invention.

FIG. 1 depicts an exemplary data processing system 100 suitable for practicing methods and systems consistent with the present invention. Data processing system 100 is connected to a network 180, such as a Local Area Network, Wide Area Network, or the internet.

Data processing system 100 contains a main memory 110, a secondary storage device 120, a processor 130, an input device 140, and a video display 150. These internal components exchange information with one another via a system bus 160. These components are standard in most computer systems suitable for use with practicing methods and configuring systems consistent with the present invention.

Memory 110 includes a program 170. One having skill in the art will appreciate that program 170 can reside in a memory on a system other than data processing system 100. Program 170 may comprise or may be included in one or more code sections containing instructions for performing their respective operations. While program 170 is described as being implemented as software, the present invention may be implemented as any combination of hardware, firmware, and/or software.

Although not shown in FIG. 1, like all data processing systems, data processing system 100 has an operating system that controls its operations, including the execution of program 170 by processor 130. Also, although aspects of one implementation consistent with the principles of the present invention are described herein with program 170 stored in main memory 110, one skilled in the art will appreciate that all or part of methods and systems consistent with the present invention may be stored on or read from other computer-readable media, such as secondary storage devices 120, e.g., hard disks, floppy disks, and CD-ROM; a carrier wave received from a network such as the internet; or other forms of ROM or RAM, either currently known or later developed. Finally, although specific components of data processing system 100 have been described, one skilled in the art will appreciate that a data processing system suitable for use with methods and systems consistent with the present invention may contain additional or different components.

Figure 2:
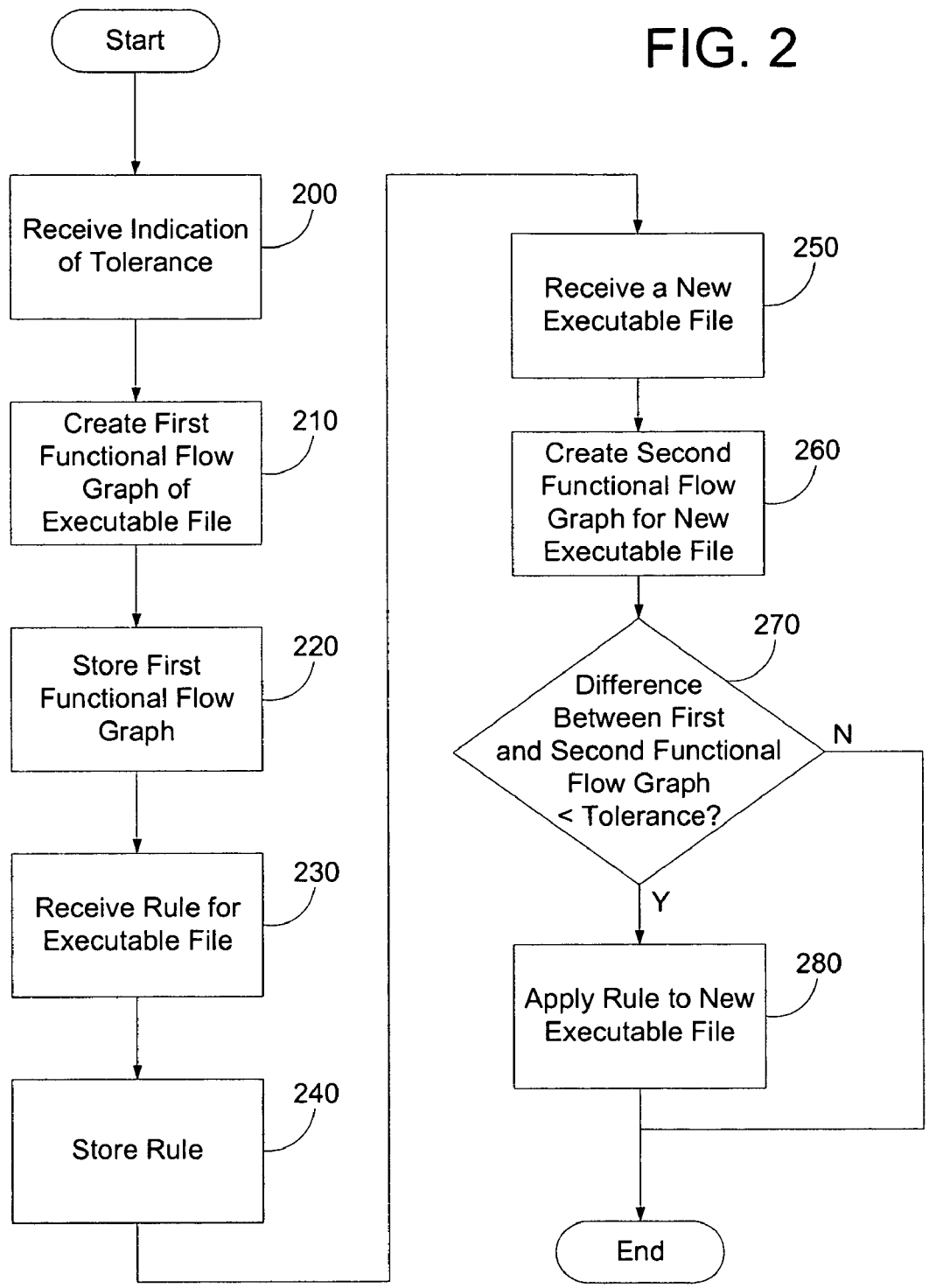
FIG. 2 depicts a flow diagram illustrating an embodiment of the present invention.

FIG. 2 depicts a flow chart illustrating the steps performed by a data processing system in one embodiment to verify the signatures of an executable file. The data processing system initially receives an indication of the tolerance for the comparison (step 200). Because methods and systems consistent with the present invention use functional flow graphs to identify the binary, there must be some level of tolerance built into the comparison step to determine whether there is an actual variation between the graphs. Techniques for setting the tolerances are well-known in the art.

The data processing system then creates a functional flow graph of an executable file (step 210), and stores the functional flow graph (step 220). The functional flow graphs depict the flow of execution between various code blocks, and therefore, illustrate conditional branches, calls to subroutines, returns from subroutines, loops, etc. Additional indications of the binary, such as the name or location of the file may be stored with the functional flow graph.

The data processing system also receives a rule for the executable file (step 230), and stores the rule (step 240). The rule includes security decisions and/or user preferences, and the security decisions may be set by a security vendor or a user. After the data processing system receives a new executable file having the same name or in the same location as the original executable file (step 250), the data processing system creates a second functional flow graph for the new executable file (step 260). The data processing system may then perform a graph isomorphism technique to determine whether the difference between the first functional flow graph and the second functional flow graph is less than the tolerance (step 270). Graph isomorphism techniques are well-known in the art. For example, Todd Sabin, "Comparing Binaries with Graph Isomorphisms," provides a method for performing graph isomorphisms.

Figure 3:
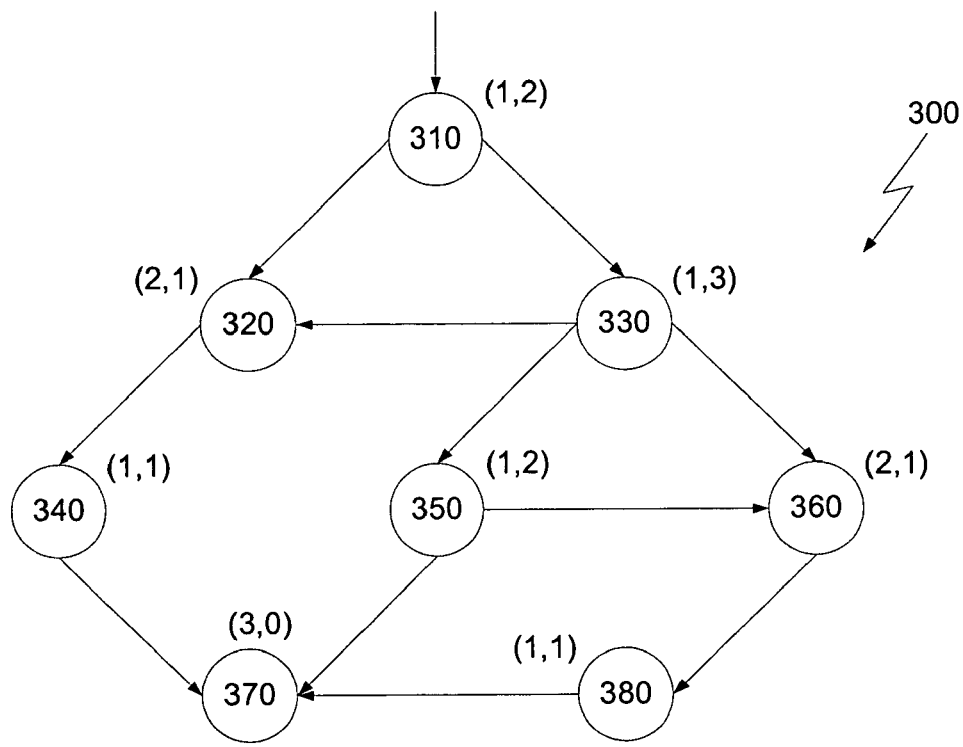
FIG. 3 depicts one embodiment of variables on a functional flow graph that may be used to perform graph isomorphism in accordance with methods and systems consistent with the present invention.

In one embodiment, the number of branches into each node and the number of branches out of each node may be used to compare the functional flow graphs. For example, the functional flow graph 300 depicted in FIG. 3 includes eight nodes. Each node may be represented by the number of branches into the node and the number of branches out of the node. Thus node 310 includes one branch in and two branches out (1,2); node 320 includes two branches in and one branch out (2,1); node 330 includes one branch in and three branches out (1,3); node 340 includes one branch in and one branch out (1,1); node 350 includes one branch in and two branches out (1,2); node 360 includes two branches in and one branch out (2,1); node 370 includes three branches in and no branches out (3,0); and node 380 includes one branch in and one branch out (1,1). These values may be compared between graphs to determine whether the graphs are substantially the same.

Returning to the flow diagram of FIG. 2, if at step 270 the data processing system determines that the difference between the first functional flow graph and the second functional flow graph is less than the tolerance, then the new executable file is a variation of the original file, and the data processing system applies the rule to the new executable file (step 280). The data processing system may either automatically apply the rule or it may simply suggest that the user apply the rule while providing the user with the option to not apply the rule.

Although discussed in terms of security technology, methods and systems consistent with the present invention also may be extended to other forms of behavior-based technologies. For example, methods and systems consistent with the present invention may be used for technology that determines whether an application is allowed to execute, modify registry keys, add or change files, etc.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for verifying a signature of a first executable file, comprising the steps of:
   creating, using a processor, a first functional flow graph from the first executable file;
   storing the first functional flow graph;
   receiving a rule for the first executable file, wherein the rule comprises a specified preference;
   storing the rule;
   receiving a second executable file, wherein the second executable file is received in the event that a second executable file received has a same file name and file location as the first executable file;
   creating a second functional flow graph from the second executable file;
   determining whether a difference between the first functional flow graph and the second functional flow graph is less than a tolerance; and
   when it is determined that the difference between the first functional flow graph and the second functional flow graph is less than the tolerance, applying the rule to the second executable file.

2. The method of claim 1, further comprising the step of receiving an indication of the tolerance before determining whether the difference between the first functional flow graph and the second functional flow graph is less than the tolerance.

3. The method of claim 1, wherein the tolerance comprises at least one of a number of branches into a node and a number of branches out of the node.

4. The method of claim 1, further comprising the step of storing an indication of the first executable file with the first functional flow graph.

5. The method of claim 4, wherein the indication comprises at least one of a name of the first executable file and a location of the first executable file.

6. A computer-readable storage medium containing a computer program of instructions for verifying a signature of a first executable file, wherein the computer program of instructions is configured to be readable by at least one processor for instructing the at least one processor to:
   create a first functional flow graph from the first executable file;
   store the first functional flow graph;
   receive a rule for the first executable file, wherein the rule comprises a specified preference;
   store the rule;
   receive a second executable file, wherein the second executable file is received in the event that a second executable file received has a same file name and file location as the first executable file;
   create a second functional flow graph from the second executable file;
   determine whether a difference between the first functional flow graph and the second functional flow graph is less than a tolerance; and when it is determined that the difference between the first functional flow graph and the second functional flow graph is less than the tolerance, apply the rule to the second executable file.

7. The computer-readable storage medium of claim 6, wherein the second executable file is received when a name of the second executable file corresponds to a name of the first executable file.

8. The computer-readable storage medium of claim 6, wherein the second executable file is received when a location of the second executable file corresponds to a location of the first executable file.

9. The computer-readable storage medium of claim 6, wherein the computer program of instructions further instructs the at least one processor to receive an indication of the tolerance before determining whether the difference between the first functional flow graph and the second functional flow graph is less than the tolerance.

10. The computer-readable storage medium of claim 6, wherein the tolerance comprises at least one of a number of branches into a node and a number of branches out of the node.

11. The computer-readable storage medium of claim 6, wherein the computer program of instructions further instructs the at least one processor to store an indication of the first executable file with the first functional flow graph.

12. The computer-readable storage medium of claim 11, wherein the indication comprises at least one of a name of the first executable file and a location of the first executable file.

13. A data processing apparatus comprising:
at least one memory device comprising a program; and
at least one processor to read the program and thereby cause the at least one processor to:
create a first functional flow graph from the first executable file;
store the first functional flow graph;
receive a rule for the first executable file, wherein the rule comprises a specified preference;
store the rule;
receive a second executable file, wherein the second executable file is received in the event that a second executable file received has a same file name and file location as the first executable file;
create a second functional flow graph from the second executable file;
determine whether a difference between the first functional flow graph and the second functional flow graph is less than a tolerance; and
when it is determined that the difference between the first functional flow graph and the second functional flow graph is less than the tolerance, apply the rule to the second executable file.

14. The data processing apparatus of claim 13, wherein the second executable file is received when a name of the second executable file corresponds to a name of the first executable file.

15. The data processing apparatus of claim 13, wherein the second executable file is received when a location of the second executable file corresponds to a location of the first executable file.

16. The data processing apparatus of claim 13, wherein the program further causes the at least one processor to receive an indication of the tolerance before determining whether the difference between the first functional flow graph and the second functional flow graph is less than the tolerance.

17. The data processing apparatus of claim 13, wherein the tolerance comprises at least one of a number of branches into a node and a number of branches out of the node.

18. The data processing apparatus of claim 13, wherein the program further causes the at least one processor to store an indication of the first executable file with the first functional flow graph.

19. The data processing apparatus of claim 18, wherein the indication comprises at least one of a name of the first executable file and a location of the first executable file.

20. An apparatus for verifying a signature of a first executable file, the apparatus comprising:
a processor configured to:
create a first functional flow graph from the first executable file;
receive a rule for the first executable file, wherein the rule comprises a specified preference;
receive a second executable file, wherein the second executable file is received in the event that a second executable file received has a same file name and file location as the first executable file;
create a second functional flow graph from the second executable file;
determine whether a difference between the first functional flow graph and the second functional flow graph is less than a tolerance; and
apply the rule to the second executable file in the event that the difference between the first functional flow graph and the second functional flow graph is less than a tolerance; and
electronic storage communicatively coupled to the processor and capable of storing the first functional flow graph and the rule for the first executable file.

21. The method of claim 1, wherein the preference is specified by a security vendor.

22. The method of claim 1, wherein the rule comprises a determination of whether the second executable is allowed to modify registry keys.

* * * * *